US007181303B2

(12) United States Patent
Scholl et al.

(10) Patent No.: US 7,181,303 B2
(45) Date of Patent: Feb. 20, 2007

(54) BUILDING BLOCKS FOR DESCRIBING PROCESS FLOWS

(75) Inventors: Juergen Scholl, Bretten (DE); Dirk Rohdemann, Muhlhausen (DE); Thomas Vomhof, Wiesloch (DE)

(73) Assignee: SAP Aktiengesellschaft, Walldorf ( * ) Notice: Subject to any disclaimer, the term of this patent is extended or adjusted under 35 U.S.C. 154(b) by 507 days.

(21) Appl. No.: 10/134,438

(22) Filed: Apr. 30, 2002

(65) Prior Publication Data

US 2003/0196186 A1 Oct. 16, 2003

Related U.S. Application Data

(60) Provisional application No. 60/372,896, filed on Apr. 15, 2002.

(51) Int. Cl.
*G06F 19/00* (2006.01)
(52) U.S. Cl. .......................................... 700/97; 700/99
(58) Field of Classification Search .......... 700/97–101; 705/8
See application file for complete search history.

(56) References Cited

U.S. PATENT DOCUMENTS

| 5,291,394 | A | * | 3/1994 | Chapman | ................. | 705/8 |
|---|---|---|---|---|---|---|
| 5,499,188 | A | * | 3/1996 | Kline et al. | ................. | 700/106 |
| 5,576,946 | A | * | 11/1996 | Bender et al. | ................. | 700/17 |
| 5,748,478 | A | | 5/1998 | Pan et al. | | |
| 5,901,062 | A | * | 5/1999 | Burch et al. | ................. | 703/2 |
| 6,115,646 | A | | 9/2000 | Fiszman et al. | | |
| 6,415,193 | B1 | * | 7/2002 | Betawar et al. | ............... | 700/97 |
| 6,522,934 | B1 | | 2/2003 | Irwin et al. | | |
| 6,834,370 | B1 | * | 12/2004 | Brandl et al. | ............... | 715/500 |
| 2003/0139936 | A1 | * | 7/2003 | Saucier et al. | ................. | 705/1 |

OTHER PUBLICATIONS

"Batch Control, Part 1: Models and Terminology", Instrument Society of America, Approved Oct. 23, 1995.
"Batch Control, Part 2: Data Structures and Guidelines for Languages", Draft 14, Instrument Society of America, (Editor's Draft) May 1999.

* cited by examiner

*Primary Examiner*—Leo Picard
*Assistant Examiner*—Alexander Kosowski
(74) *Attorney, Agent, or Firm*—Fish & Richardson P.C.

(57) ABSTRACT

A method for describing a process flow includes receiving a first root-independent building block and a second root-independent building block, receiving assembly instructions for assembling the first building block and the second building block to describe the process flow, and linking the first building block to the second building block in accordance with the assembly instructions. The first building block describes a first activity and a second building block describes a second activity. The first activity and the second activity correspond to portions of the process flow.

30 Claims, 6 Drawing Sheets

BUILDING BLOCKS FOR DESCRIBING PROCESS FLOWS

This application claims the priority of U.S. Provisional Application Ser. No. 60/372,896, filed Apr. 15, 2002 and entitled "RECIPE MANAGEMENT," which is hereby incorporated by reference in its entirety.

BACKGROUND

The present invention relates to the description of process flows.

The ability to rapidly increase or decrease production of a product at a particular site is often instrumental in determining the profitability of the product. For example, if a memory chip manufacturer requires a long time to bring a particular memory chip to market, then rapid changes in the semiconductor industry may, over time, decrease the desirability of the memory chip and erode the profit that can be reaped by producing the chip. As another example, unexpected or seasonal increases in demand for a particular food product may be met by a producer that rapidly scales up production volume at several different sites, and then lowers production once the demand has been met.

Recipes include information related to the process flow for the production of a product. Recipes can also include definitions of resource, input, and output requirements.

There are different classes of recipes. General recipes include information related to a process flow for the production of a product, independent of specific production equipment. General recipes identify raw materials, relative quantities, and required processing, but lack specific information regarding a particular site or the equipment available at that site. Master recipes include information related to process flow including equipment capabilities. Master recipes can include information that is specific to a process cell. Site recipes include site-specific information related to the local constraints, such as language and available raw materials at a particular production site.

SUMMARY

The present invention provides methods and apparatus, including computer program products, for generating a recipe using building blocks. Building blocks describe activities that can correspond to portions of a product flow. Building blocks can be used as templates to create process elements in a recipe. Building blocks are independent of a recipe and can possess additional data used for assembling the building blocks in a recipe. Building blocks can be created from scratch by a user or by copying dependent process elements that are maintained within a recipe.

In general, in one aspect, a method for describing a process includes receiving a first root-independent building block and a second root-independent building block, receiving assembly instructions for assembling the first building block and the second building block to describe the process flow; and linking the first building block to the second building block in accordance with the assembly instructions. The first building block describes a first activity and the second building block describes a second activity. The first activity and the second activity correspond to portions of the process flow.

Implementations of this or any other aspect can include one or more of the following features. Linking the first building block to the second building block can include assembling a recipe to describe the process flow. The assembled recipe can be a general recipe. Receiving assembly instructions can include receiving a description of a time sequence of the first building block and the second building block, or receiving a description of a material flow between the first building block and the second building block. The first activity can be independent of the second activity or a physical act. The first activity can also be equipment independent.

Receiving the first building block can include receiving a child building block that depends from the first building block, transforming a root-dependent element into the first building block, receiving the first building block from a user, or receiving connection information describing how the first building block is to be connected to a process. The child building block can describe a child activity in greater detail than the first building block describes the first activity.

Receiving connection information can include receiving characteristics of the material undergoing the process activity described by the first building block. Describing a process can also include performing the process flow.

In general, in another aspect, a method for manufacturing a product includes receiving a description of a process flow for manufacturing the product, and manufacturing the product in accordance with the received description. The description is formed using a root-independent building block describing an activity corresponding to a portion of the process flow.

In general, in another aspect, a computer program product for describing a process flow includes instructions to cause a processor to insert a root-independent building block into a recipe having a root and describing a process flow. The building block describes an activity corresponding to a portion of the process flow described by the recipe. The computer program product is tangibly stored on machine readable media.

Implementations of this or any other aspect can include one or more of the following features. The wherein the instructions also cause the processor to receive instructions used to insert the building block, define a process element that depends from a root using the building block to describe activity in the process element, or define a one of a process stage element, a process operation element, and a process action element.

The building block can be a child building block that depends from a parent, root-independent building block. The parent building block can describe a parent activity in less detail than the building block describes the activity. The instructions can also cause the processor to insert the parent building block into the recipe.

The instructions can also cause the processor to receive a definition of the building block from a user, transform a root-dependent process element into the building block, or receive sequence information describing a timing of the building block within the recipe. The sequence information can be included in the building block.

In general, in another aspect, a computer program product for describing a first process flow and a second process flow can include instructions to cause a processor to access a root-independent building block describing an activity corresponding to portions of the first process flow and the second process flow, insert the building block into a first description of the first process flow, and insert the building block into a second description of the second process flow. The first description can be a first recipe hierarchy and the second descriptions can be a second recipe hierarchy.

The invention can be implemented to realize one or any combination of the following advantages. A user is able to rapidly describe a process flow using root-independent building blocks to populate a recipe. In particular, a user can reuse the same building block in more than one recipe. This saves the user time, since there is no need for the user to repeatedly redefine elements describing the same activity. Also, a user need not understand the particular details of the process flow captured in a building block in order to assemble a recipe. Rather, a relatively skilled technician can create and distribute a set of building blocks that are assembled by relatively untrained individuals. Moreover, a user can finely tune an element in a recipe for unique or specialized processes without fear of losing the generic information included in the building block used to create the element in the recipe. Furthermore, a building block can describe a portion of a process flow at several levels of detail, ensuring that the description is complete and the material flow and timing of activity in the process flow are coordinated. Additionally, a user is better able to understand, tune, and debug even a complex recipe assembled from building blocks, since the user is able to focus on interactions between the building blocks rather than activities within the building blocks. These interactions include material flow between portions of the process flow and the timing of portions of the process flow.

The developed recipe can be used to rapidly increase production of a product to, e.g., maximize the profitability of the product or meet unexpectedly high demand.

BRIEF DESCRIPTION OF THE DRAWINGS

Like reference numbers and designations in the various drawings indicate like elements.

DETAILED DESCRIPTION

Figure 1:
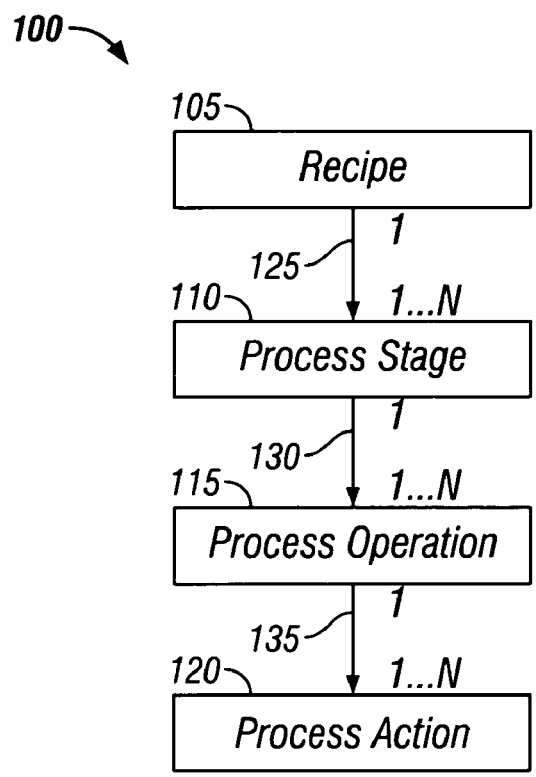
FIG. 1 shows a recipe in accordance with the invention.

FIG. 1 shows a recipe 100 for describing a process flow in accordance with the invention. A process flow is a sequence of chemical, physical, or biological activities for the conversion, transport, or storage of material or energy. For example, process flows are used for the production of specialty chemical products, pharmaceutical products, fuels, cosmetics, and foodstuffs.

Recipe 100 maps the process flow in a hierarchy and includes several different classes of process elements. In particular, recipe 100 includes a root recipe element 105, one or more process stage elements 110, one or more process operation elements 115, and one or more process action elements 120. Process elements 110, 115, and 120 depend from root recipe element 105.

Recipe 100 also includes links 125, 130, and 135 that interdependently link process elements 105, 110, 115, and 120 in the hierarchy with a cardinality from 1 to 1 . . . N. In particular, one or more links 125 form a parent-child relationship between parent recipe element 105 and process stage elements 110, one or more links 130 form a parent-child relationship between process stage elements 110 and process operation elements 115, and one or more links 130 form a parent-child relationship between process operation elements 115 and process action elements 120.

Elements 105, 110, 115, and 120 describe portions of the real-world process flow in increasingly greater detail. Fewer or more levels can be included in the hierarchy of recipe 100 to describe the process flow, and the detail described at each level can be changed. However, in one embodiment, elements 105, 110, 115, and 120 describe the process flow as follows.

Recipe element 105 is the root element of recipe 100 and describes the process flow in general terms. Usually, all the activities necessary for the process flow depend from recipe element 105, and a recipe 100 need not possess more than one recipe element 105.

Recipe element 105 includes a serial or parallel sequence of process stages 110. Each process stage 110 can describe a portion of recipe element 105 that operates independently from other process stages 110. Each process stage 110 usually results in a planned sequence of chemical or physical changes in the material being processed. Examples process stages include activities like "drying" and "polymerization."

Each process stage 110 can be subdivided into a set of process operations 115. Each process operation 115 can be a processing activity that results in a physical, chemical, or biological change of a material or substance. Process operations 115 can be defined independently of the target equipment configuration. Examples process operations 115 include "degas solution to remove oxygen," "bias electrode," and "mix."

The difference between a process stage 110 and a process operation 115 can vary. In one embodiment of a recipe element 105, process operations 115 are independent of one another, whereas process stages 110 are dependent on other process stages 110. The example process stages 110 described above may not be independent of one other. For example, biasing an oxygen-sensitive material requires that the solution be previously degassed.

Each process operation 115 can be subdivided into a set of process actions 120. Process actions 120 are the lowest level of processing within each recipe element 105. Each process action 120 can describe a relatively minor processing act in relatively great detail. Example process actions 120 include "heat to 100° C.," "connect the positive lead to the electrode," or "lower the electrode into solution." Each process action 120 thus provides relatively detailed descriptions of the physical acts that are to be performed.

Figure 2:
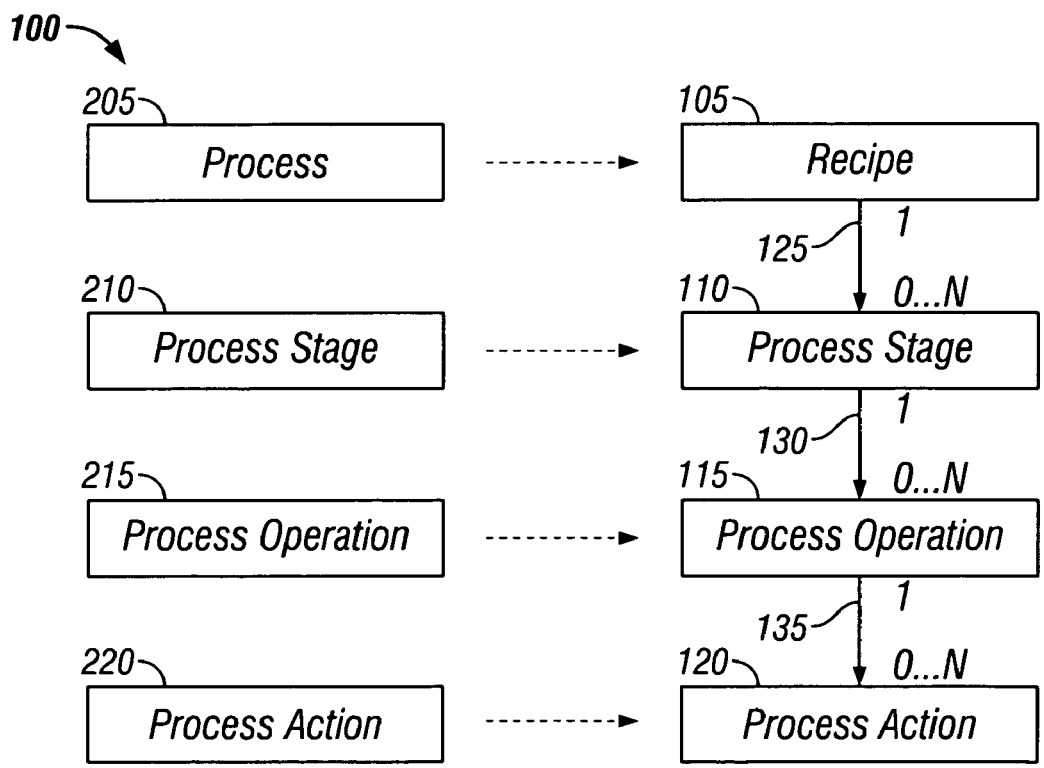
FIG. 2 shows a recipe assembled from building blocks in accordance with the invention.

As shown in FIG. 2, recipe 100 can be assembled from root-independent building block elements 205, 210, 215, 220. Building block elements 205, 210, 215, 220 do not depend from a root recipe element 105 but describe activities that correspond to portions of a real-world process flow.

A process element 205 that is independent of a root can be used to form root recipe element 105. Process element 205 is an equipment-independent building block that describes the process flow activities portion of root recipe element 105 without additional information. Recipe 100 can thus be "assembled" using process element 205 to describe process flow activity information.

Building blocks 205, 210, 215, 220 can describe activities at various levels of detail and can be inserted into a recipe hierarchy to populate the hierarchy. For example, a process stage building block 210 that is independent of a root can be linked to root recipe 105 to form process stage 110, a process operation building block 215 that is independent of a root can be linked to root recipe 105 to form process operation 115, and a process action building block 220 that is independent of a root can be linked to root recipe 105 to form process action 120. Building blocks 205, 210, 215, 220 can thus describe activities at levels of detail that correspond to the level of detail in process elements 105, 110, 115, 120. For example, process stage building block 210 can describe activities that operate independently of other activities. Process operation building block 215 can describe a processing activity that results in a physical, chemical, or biological change of a material or substance. Process action building block 220 can describe a relatively minor physical activity in relatively great detail.

By assembling a recipe using building block elements, a user can increase or decrease production of a product more rapidly. In particular, a user can define a set of common process elements and then use the set of common element to assemble several different recipes. The set of building block elements can also be received from the supplier of the recipe management system or from the manufacturer of production equipment. The manufacturer of production equipment can supply the building block elements to the user to ensure that the user is easily able to integrate the manufacturer's equipment into a production line.

Root-independent building blocks also simplify the management of process elements. Process elements can be changed, created, or deleted independently in each recipe without fear of losing the information in the root-independent building block element.

Figure 3:
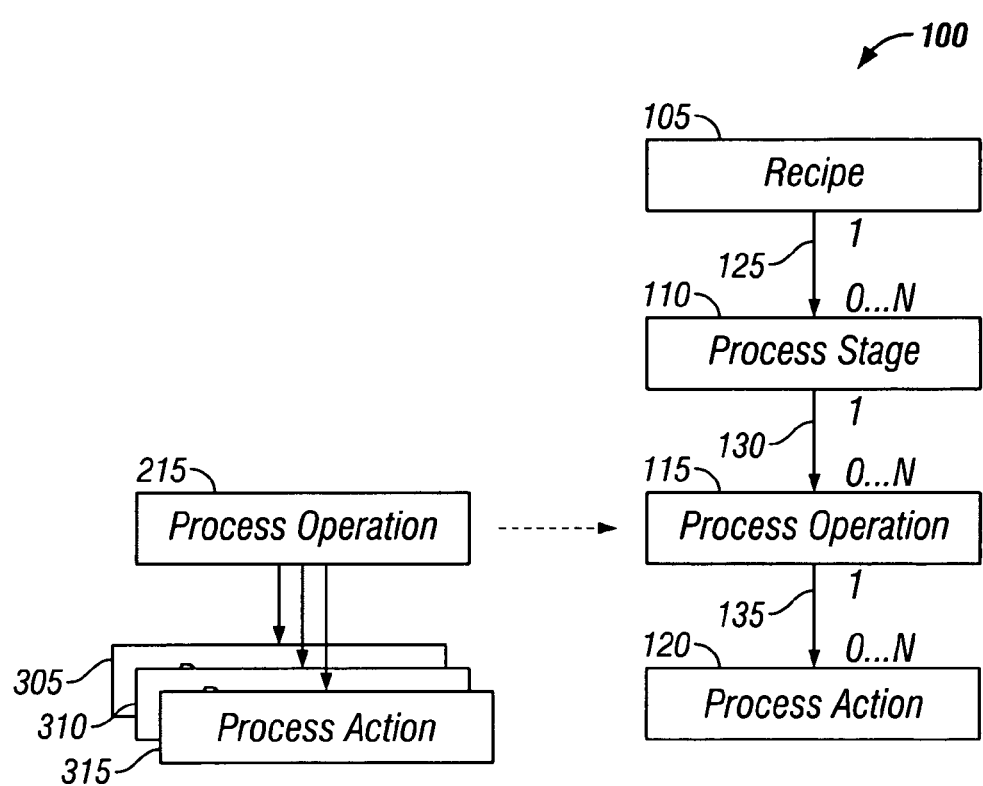
FIG. 3 shows a building block that includes dependent children.

Building blocks 205, 210, 215 can also have one or more dependent children building blocks 210, 215, 220 that are independent of a root. Thus, building blocks 205, 210, 215, 220 can be added into recipe 100 individually or collectively. As shown in FIG. 3, process operation building block 215 has three dependent children process action building blocks 305, 310, 315 that follow process operation building block 215 when process operation building block 215 is used to assemble recipe 100.

Figure 4:
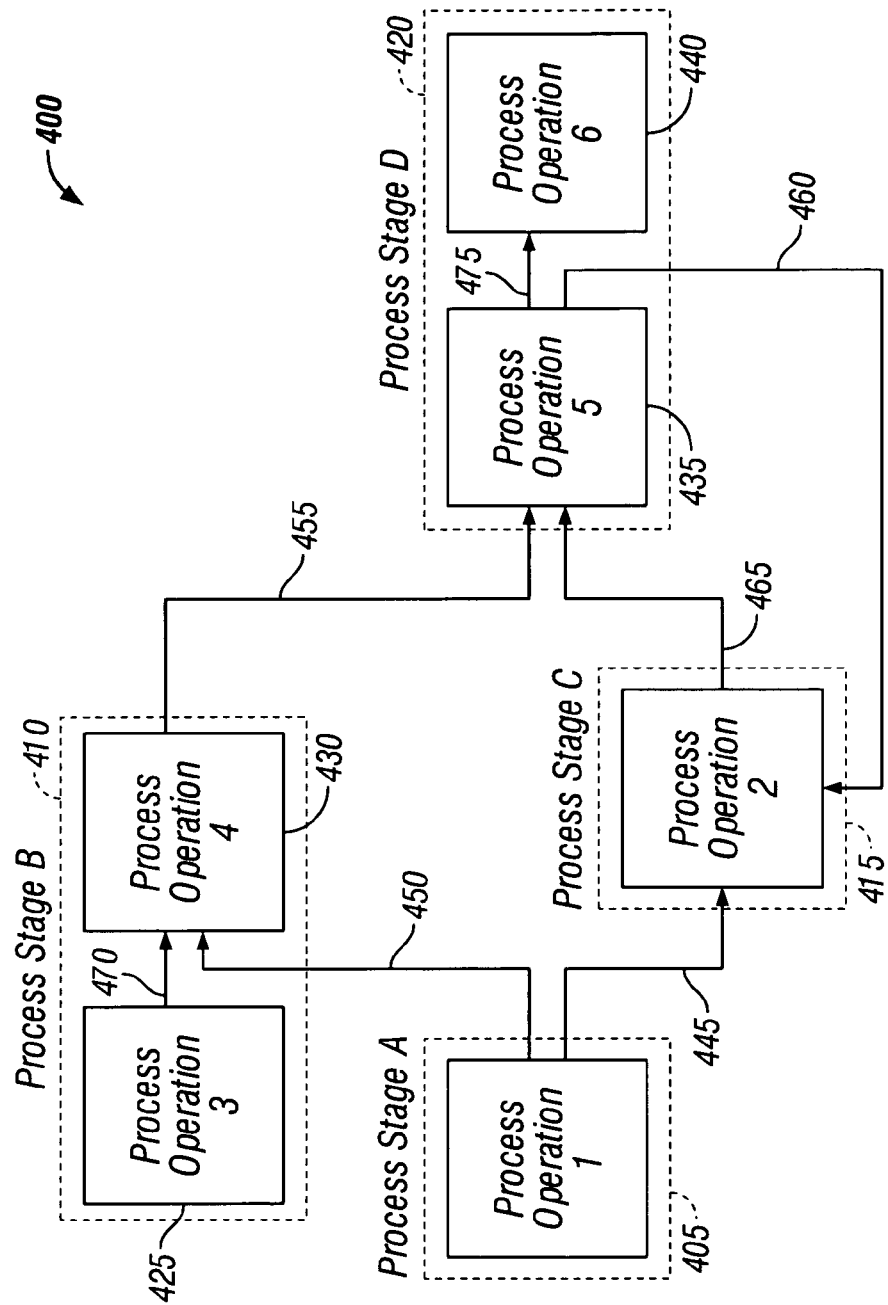
FIG. 4 shows a process flow.

As shown in FIG. 4, a process flow 400 can include multiple process stages 405, 410, 415, 420 organized as a set of serial and/or parallel elements. Process stage 410 includes a serial pair of process operations 425, 430, and process stage 420 includes a serial pair of process operations 435, 440.

Process stages 405, 410, 415, 420 are linked by a collection of stage sequence links 445, 450, 455, 460, 465 that together describe the organization of process stages 405, 410, 415, 420 in the process flow. In particular, stage sequence links 445, 450, 455, 460, 465 describe the temporal organization (i.e., order in time) of process stages 405, 410, 415, 420. For example, a process flow may require that a solvent be evaporated from a solution before a new material is admixed into the solution. The temporal organization of such procedures is described by sequence links 445, 450, 455, 460, 465.

Generally, the temporal organization of process stages 405, 410, 415, 420 follows the flow of materials in the process flow. In the previous example, the solution "flows" from distillation to admixing. However, the temporal organization of process stages 405, 410, 415, 420 does not necessarily follow the flow of materials. For example, a certain piece of equipment may be required for two stages of a process flow. Even though material does not flow directly from one stage to the other, the stages can be staggered in time using sequence links 445, 450, 455, 460, 465.

Process operations 425, 430 are linked by a sequence link 470, and process operations 435, 440 are linked by a sequence link 475. Sequence links 470, 475 can be included in the description of the process flow provided by operations 425, 430, 435, 440, or in the description provided by process stages 410, 420.

Any of recipe 400, process element 205, or building block children of, for example, process element 205 can include links 445, 450, 455, 460, 465, 470, 475 to describe process flow 400. Other building blocks 210, 215, 220 and process elements 405, 410, 415, 420 can include links that describe the temporal organization and/or the material flow within the process flow.

Figure 5:
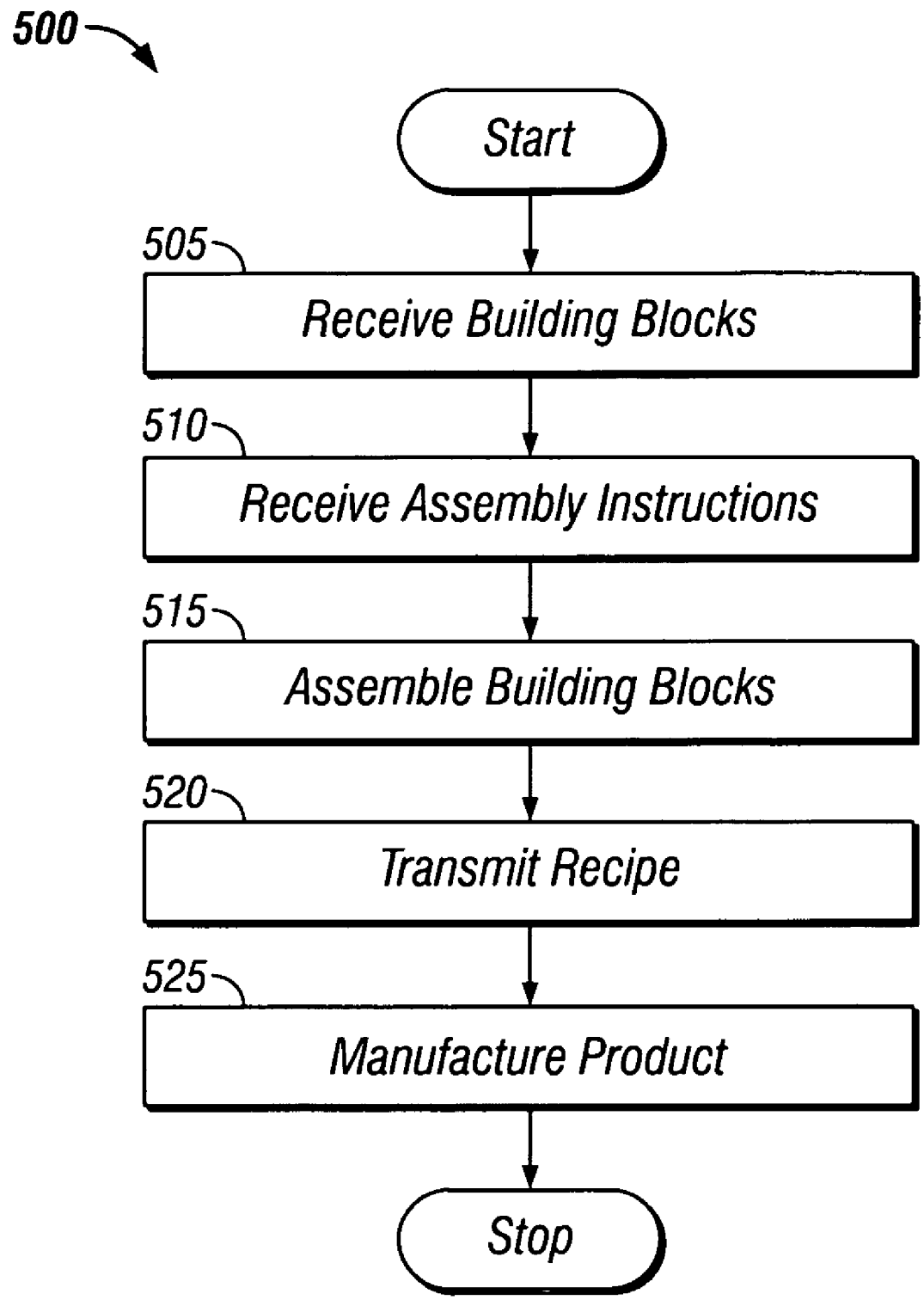
FIG. 5 shows a method in accordance with the invention for describing a process flow.

FIG. 5 shows a method in accordance with the invention for describing a process. As shown, a system receives building block information (step 505) from, e.g., a manufacturer, a plant operator, or by copying a root-dependent operation. The building block information can include one or more parent building blocks that are root-independent yet have dependent children. The dependent children can include link information describing a temporal organization of the children. The system can store the received building block information in, e.g., a building block database. The system then receives assembly instructions (step 510). The assembly instructions can include, for example, links describing a temporal organization of the building blocks, material information, and formula information. The system assembles the building blocks into a recipe in accordance with the assembly instructions (step 515). The recipe can be, for example, a master recipe, a general recipe, or a site recipe. The system transmits the recipe to a receiver such as, e.g., a manufacturer or a manufacturing system (step 520). The receiver can use the recipe to manufacture a product (step 525) and, e.g., rapidly meet unexpectedly high demand or decrease time to market.

In one implementation, the assembled building blocks form a general recipe that is converted into a master recipe in accordance with the equipment that is to be used to execute the process flow. The master recipe can be transmitted to the receiver.

Figure 6:
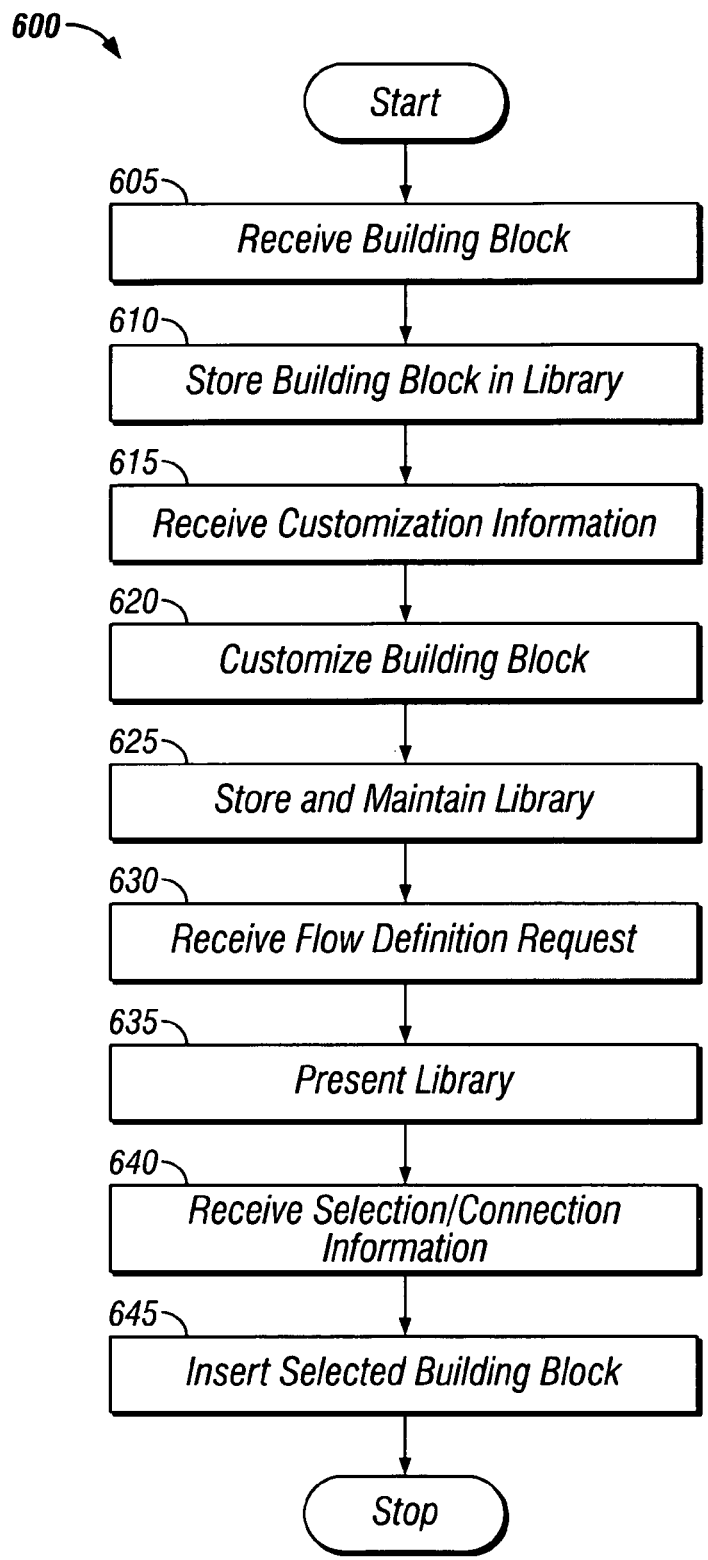
FIG. 6 shows another method in accordance with the invention for describing a process flow.

FIG. 6 shows another method in accordance with the invention for describing a process flow. As shown, a system receives a building block (step 605). The building block can be created by a relatively skilled technician and distributed to different plants or to systems operated by individuals who lack a detailed technical understanding of the activities described by the building block. The building block can also be created by copying a root-dependent element from a recipe or from scratch by, for example, an onsite user.

The system stores the received building block in, e.g., a building block database library (step 610). The system can group related building blocks in the building block library by, e.g., industry or product, a class of recipe where the building blocks are commonly used, input or output materials, or an activity class described by the recipe. Optionally, the system can also receive customization information (step 615) and customize the received building block (step 620). Customization can include, for example, adapting a building block to a particular industry or a particular regulatory environment. For example, mixing materials in the chemical industry can include process activities that are different from the process activities when mixing for the production of food. As another example, refining fuel in one jurisdiction may include process activities that are different from the process activities in another jurisdiction.

The system stores and maintains the library of building blocks, including the received building block (step 625). The system receives a request to define a process flow (step 630). In one implementation, a user initiated the request. Alternatively, a computer program can initiate the request. In response, the system presents for selection its library of building blocks (step 635). The system receives a selection of one or more building blocks and connection information specifying the relationship of the selected one or more building blocks (step 640). Such connection information can specify material inputs, material outputs, timing information, and the position of the selected building block within a recipe hierarchy. The system then creates a process flow using the selected building block and the connection information (step 645).

Figure 7:
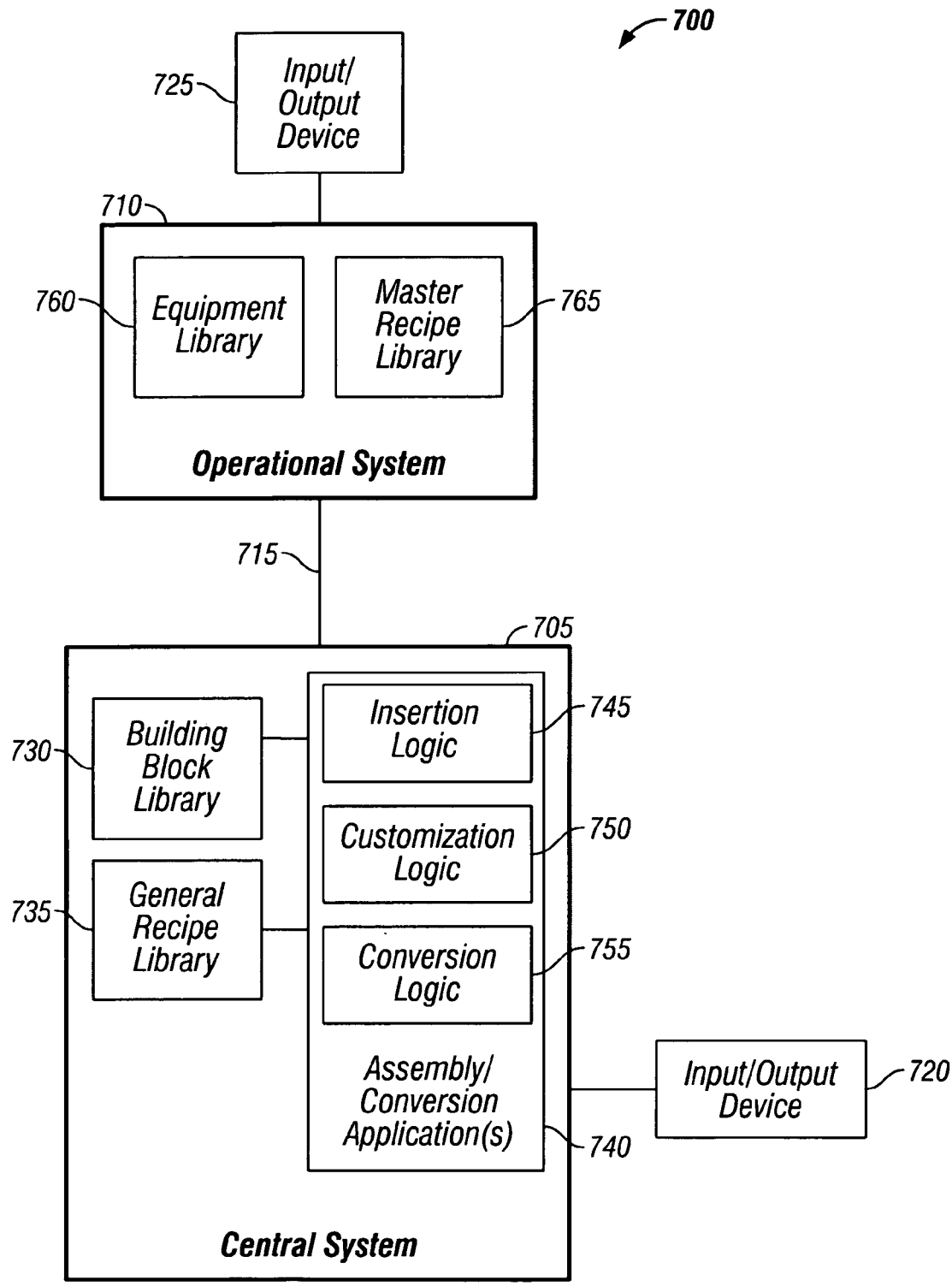
FIG. 7 shows a system in accordance with the invention for describing a process flow.

As shown in FIG. 7, a network system in accordance with the invention for describing a process flow includes a central system 705 and an operational system 710 connected by a network 715 for data exchange. Operational system 710 can, for example, be remote from central system 705 and owned and operated by another party. Central system 705 receives user input and dispenses output over an input/output device 720. Operational system 710 receives user input and dispenses output over an input/output device 725.

Central system 705 includes a building block library 730 and a general recipe library 735, and executes one or more assembly/conversion applications 740. Building block library 730 stores a collection of building blocks. General recipe library 735 stores a collection of general recipes, including at least one incomplete general recipe that only partially describes a process flow. Assembly/conversion applications 740 includes instructions for completing the incomplete general recipe and forming a master recipe at operational system 710. In particular, assembly/conversion applications 740 includes insertion logic 745, customization logic 750, and conversion logic 755. Insertion logic 745 includes instructions for inserting a building block into the incomplete recipe or instructions for joining two building blocks. Insertion logic 745 also allows central system 705 to reuse the same building block for insertion into more than one recipe or to assemble more than one recipe. Customization logic 750 includes instructions for customizing a building block before or after insertion into a recipe. Conversion logic 755 includes instructions for converting a completed general recipe into a master or a site recipe, as discussed further below.

Operational system 710 includes an equipment library 760 and a master recipe library 765. Equipment library 760 stores information related to the operational capability of process equipment, and master recipe library 765 stores one or more recipes describing one or more process flows executed using the process equipment described in equipment library 760. Operational system 710 can be used to directly control the process equipment, or operational system 710 can simply relay one or more master recipes to process equipment control systems.

In operation, central system 705 receives one or more building blocks from, e.g., a user who describes the building block from scratch by inputting data over input/output device 720. Alternatively, central system 750 can receive a selection from the user over input/output device 720 identifying process elements from one or more general recipes in general recipe library 735. Central system 750 then converts the selected elements into root-independent building blocks. Central system 705 stores the received building block in building block library 730.

If necessary, central system 705 can customize the received building block using customization logic 750. Also, central system 705 can receive customization instructions from a user over input/output device 720 and customize the building block in accordance with the customization instructions. Central system 705 can store the customized building block in building block library 730.

When a user decides to complete the incomplete general recipe, the user selects an appropriate building block using input/output device 720 and inputs connection information describing how to connect the selected building block to the incomplete recipe. Central system 750 receives the selection and connection information, and inserts the selected building block into the incomplete general recipe in accordance with the selection and connection information. Central system 750 can store the general recipe with the inserted building block whether or not the insertion completed the recipe.

When a user decides to manufacture a product, the user inputs identifies operational system 710 to central system 705 using input/output device 720. After central system 705 receives the identification of operational system 710, central system 705 requests and receives the equipment capabilities stored in equipment library 760 from operational system 710. Using conversion logic 755, central system 705 converts the identified general recipe into a master recipe. Central system 705 then transmits the master recipe to operational system 710, which stores the master recipe in master recipe library 765.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs ("application-specific integrated circuits").

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular implementations. Other implementations are within the scope of the invention. For example, equipment information can be stored at a central system, and assembly/conversion application(s) can be stored at an operational system.

What is claimed is:

1. A method for describing a process flow, comprising:
   receiving a first building block that is root-independent and a second building block that is root-independent, the first building block describing a first activity and the second building block describing a second activity, the first activity and the second activity corresponding to portions of the process flow;
   receiving first customization information relevant to customizing the first building block to an industry or a regulatory environment;
   customizing the first building block in accordance with the first customization information;
   storing a customized first building block and the second building block in a building block library;
   receiving assembly instructions for assembling a general recipe that comprises the first building block and the second building block; and
   linking the customized first building block and the second building block in accordance with the assembly instructions to form at least a portion of the general recipe.

2. The method of claim 1, wherein the assembly instructions comprise a description of a time sequence of the first building block and the second building block.

3. The method of claim 1, wherein the assembly instructions comprise a description of a material flow between the first building block and the second building block.

4. The method of claim 1, wherein the first activity is independent of the second activity.

5. The method of claim 1 wherein the first activity comprises a physical act.

6. The method of claim 1, wherein the first activity is equipment independent.

7. The method of claim 1, wherein receiving the first building block comprises receiving a child building block that depends from the first building block, the child building block describing a child activity in greater detail than the first building block describes the first activity.

8. The method of claim 1, further comprising transforming a root-dependent element into the first building block.

9. The method of claim 1, wherein the first building block is received from a user.

10. The method of claim 1, wherein receiving the first building block comprises receiving connection information describing how the first building block is to be connected to a process.

11. The method of claim 10, wherein the connection information comprises characteristics of the material undergoing the process activity described by the first building block.

12. The method of claim 1, further comprising performing the process flow to produce a product.

13. The method of claim 12, wherein the process flow is performed in the regulatory environment.

14. The method of claim 1, wherein the general recipe describes the process flow in the absence of site-specific information.

15. A computer program product, tangibly stored on one or more machine readable media, for describing process flows, the product comprising instructions to cause at least one processor to:
   customize a building block in accordance with first customization information relevant to performance of activities described by the building block in a first industry or a first regulatory environment;
   insert the building block customized in accordance with the first customization information into a first recipe having a first root and describing a first process flow for production of a first product, the building block describing an activity corresponding to a portion of the first process flow; customize the building block in accordance with second customization information relevant to performance of activities described by the building block in a second industry or a second regulatory environment; and
   insert the building block customized in accordance with the second customization information into a second recipe having a second root and describing a second process flow for production of a second product, the activity described by the building block also corresponding to a portion of the second process flow.

16. The product of claim 15, wherein the instructions also cause the at least one processor to receive instructions used to insert the building block into the second recipe.

17. The product of claim 15, wherein the instructions cause the at least one processor to define a process element using the building block to describe activity in the process element.

18. The product of claim 17, wherein the instructions cause the at least one processor to define one of a process operation element and a process action element.

19. The product of claim 15, wherein: the building block comprises a child building block that depends from a parent, root-independent building block and describes a child activity, the parent building block describing a parent activity in less detail than the child building block describes the child activity; and
   the instructions cause the at least one processor to insert the parent building block into the first recipe and the second recipe.

20. The product of claim 15, wherein the instructions also cause the at least one processor to receive a definition of the building block from a user.

21. The product of claim 15, wherein the instructions also cause the at least one processor to transform a root-dependent process element into the building block.

22. The product of claim 15, wherein the instructions also cause the at least one processor to receive sequence information describing a timing of the activity described by the building block within the first process flow.

23. The product of claim 22, wherein the sequence information is included in the building block.

24. The product of claim 15, wherein the first recipe comprises a general recipe that describes the first process flow in the absence of site-specific information.

25. The product of claim 15, wherein the instructions cause the at least one processor to:
   perform the first process flow to produce the first product in the first regulatory environment; and
   perform the second process flow to produce the second product in the second regulatory environment.

26. A computer program product, tangibly stored on one or more machine readable media, for describing a first process flow for the production of a first product and a second process flow for the production of a second product, the product comprising instructions to cause at least one processor to:

receive a root-independent building block describing an activity corresponding to a first portion of the first process flow and a second portion of the second process flow; receive customization information relevant to customizing the building block to a regulatory environment;

customize the building block in accordance with the customization information;

insert the building block into a first general recipe hierarchy that describes the first process flow; and insert the building block into a second general recipe hierarchy that describes the second process flow.

27. The product of claim 26, wherein the instructions cause the at least one processor to perform the first process flow to produce the first product in the regulatory environment.

28. The method of claim 26, wherein the general recipe describes the process flow in the absence of site-specific information.

29. A system comprising:

a library of root-independent building blocks that describe activities the library including a first building block;

customization logic for customizing building blocks to an industry or a regulatory environment in accordance with customization information; and insertion logic for assembling the building blocks to form general recipe hierarchies having a root and describing a process flow, wherein the process flow includes activities of the assembled building blocks, and wherein the insertion logic can insert the first building block into a general recipe hierarchy having a first root and describing a first process flow for the production of a first product and into a second general recipe hierarchy having a second root and describing a second process flow for the production of a second product; and an output to make the general recipe hierarchies formed by the insertion logic available for the production of products.

30. The system of claim 29, further comprising conversion logic for converting general recipe hierarchy into a master recipe in accordance with a description of equipment capabilities.

* * * * *